United States Patent
Miki et al.

(10) Patent No.: US 10,243,209 B2
(45) Date of Patent: Mar. 26, 2019

(54) ACTIVE MATERIAL COMPOSITE PARTICLE, ELECTRODE ACTIVE MATERIAL LAYER, AND ALL SOLID LITHIUM BATTERY

(71) Applicant: TOYOTA JIDOSHA KABUSHIKI KAISHA, Toyota-shi, Aichi-ken (JP)

(72) Inventors: Nariaki Miki, Susono (JP); Yuki Matsushita, Atsugi (JP); Kouichi Sugiura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 15/091,141

(22) Filed: Apr. 5, 2016

(65) Prior Publication Data

US 2016/0315324 A1 Oct. 27, 2016

(30) Foreign Application Priority Data

Apr. 27, 2015 (JP) ................................. 2015-090425

(51) Int. Cl.

| H01M 4/62 | (2006.01) |
|---|---|
| H01M 10/0562 | (2010.01) |
| H01M 4/04 | (2006.01) |
| H01M 4/1391 | (2010.01) |
| H01M 4/525 | (2010.01) |
| H01M 4/505 | (2010.01) |

(Continued)

(52) U.S. Cl.
CPC ........... *H01M 4/505* (2013.01); *H01M 4/131* (2013.01); *H01M 4/366* (2013.01); *H01M 4/485* (2013.01); *H01M 4/525* (2013.01); *H01M 10/0525* (2013.01); *H01M 10/0562* (2013.01); *H01M 4/1391* (2013.01); *H01M 2300/0068* (2013.01)

(58) Field of Classification Search
CPC ..... H01M 4/131; H01M 4/1391; H01M 4/525
See application file for complete search history.

(56) References Cited

U.S. PATENT DOCUMENTS

| 2004/0096745 A1* | 5/2004 | Shibano .............. C01B 21/0821 429/322 |
|---|---|---|
| 2009/0081554 A1 | 3/2009 | Takada et al. |

(Continued)

FOREIGN PATENT DOCUMENTS

| CN | 103124695 A | 5/2013 |
|---|---|---|
| JP | 2004-179158 A | 6/2004 |

(Continued)

OTHER PUBLICATIONS

Bentini, G. G. et al. "Damage Effects Produced in the Near-Surface Region of X-Cut LiNbO 3 by Low Dose, High Energy Implantation of Nitrogen, Oxygen, and Fluorine Ions." Journal of Applied Physics, vol. 96, pp. 242-247, 2004.

(Continued)

*Primary Examiner* — Imran Akram
(74) *Attorney, Agent, or Firm* — Oliff PLC (57) ABSTRACT

An active material composite particle is capable of suppressing a reaction with a sulfide solid electrolyte material at high temperature. The active material composite particle may include an oxide active material of rock salt bed type and a coat layer containing lithium niobate formed on a surface of the oxide active material, wherein a thickness of the coat layer is in the range of 25 nm to 94 nm.

17 Claims, 2 Drawing Sheets

(51) Int. Cl.
*H01M 10/0525* (2010.01)
*H01M 4/131* (2010.01)
*H01M 4/36* (2006.01)
*H01M 4/485* (2010.01)

(56) References Cited

U.S. PATENT DOCUMENTS

| | | | |
|---|---|---|---|
| 2009/0155692 A1* | 6/2009 | Park | C01G 23/003 429/231.1 |
| 2010/0104942 A1 | 4/2010 | Lange et al. | |
| 2010/0273062 A1* | 10/2010 | Tsuchida | H01M 4/131 429/304 |
| 2013/0177821 A1* | 7/2013 | Tsuchida | H01M 4/131 429/323 |
| 2013/0209890 A1 | 8/2013 | Nagatomi | |
| 2014/0308572 A1* | 10/2014 | Tsuchida | H01M 4/505 429/162 |
| 2015/0024280 A1* | 1/2015 | Uchiyama | H01M 4/505 429/304 |
| 2015/0287985 A1* | 10/2015 | Miki | H01M 4/366 429/231.1 |
| 2016/0043391 A1 | 2/2016 | Nagatomi | |
| 2016/0211519 A1* | 7/2016 | Uchiyama | C01G 53/50 |
| 2016/0233553 A1* | 8/2016 | Yamasaki | H01M 4/13 |
| 2016/0315324 A1 | 10/2016 | Miki et al. | |
| 2017/0018772 A1* | 1/2017 | Satow | H01M 4/62 |

FOREIGN PATENT DOCUMENTS

| | | |
|---|---|---|
| JP | 2010-244847 A | 10/2010 |
| JP | 2012-074240 A | 4/2012 |
| JP | 2012-099323 A | 5/2012 |
| JP | 2014-049310 A | 3/2014 |
| JP | 2015-008073 A | 1/2015 |
| JP | 2015-056307 A | 2/2016 |
| KR | 10-2013-0140684 A | 12/2013 |
| WO | 2007/004590 A1 | 1/2007 |

OTHER PUBLICATIONS

Vennos, Deborah et al. "Structure of Lithium Niobium Nitride," Acta Cryst., C48, pp. 610-612, 1992.
Jun. 29, 2017 Office Action issued in U.S. Appl. No. 15/015,201.
Motohashi, Teruki et al. "Crystal Structure and Superconducting Properties of Hexagonal Lithium-Niobium Oxynitride". Inorganic Chemistry, vol. 51, pp. 11184-11189, 2012.
U.S. Appl. No. 15/015,201, filed Feb. 4, 2016 in the name of Miki.
"LiNbO3-coated LiCoO2 as cathode material for all solid-state lithium secondary batteries," Electrochemistry Communications, vol. 9, No. 7, Jun. 15, 2007 pp. 1486-1490.
Nguyen, Le Quang et al. "A Novel Lithium Conductor Prepared by Unbalanced Magnetron R.F. Sputtering." Thin Solid Films, vol. 293, pp. 175-178, 1997.
Jan. 26, 2018 Office Action issued in U.S. Appl. No. 15/015,201.
Nguyen, Le Quang et al. "Thin Film of Lithium Niobium Oxynitride as Ionic Conductor." Journal of Applied Physics, vol. 80, No. 5, pp. 2914-2917, Sep. 1, 1996.
Jun. 7, 2018 Notice of Allowance issued in U.S. Appl. No. 15/015,201.

* cited by examiner

ACTIVE MATERIAL COMPOSITE PARTICLE, ELECTRODE ACTIVE MATERIAL LAYER, AND ALL SOLID LITHIUM BATTERY

This application claims the benefit of Japanese Patent Application No. 2015-090425, filed Apr. 27, 2015. The disclosure of the prior application is hereby incorporated by reference herein it its entirety.

TECHNICAL FIELD

The disclosure relates to active material composite particles capable of suppressing a reaction with a sulfide solid electrolyte material at high temperature.

BACKGROUND

Along with the rapid distribution of information-related equipment such as personal computers in recent years, the development of batteries that are utilized as electric power sources thereof has been advanced. Furthermore, the development of batteries for electric vehicles or hybrid vehicles is in progress in the automobile industry as well. Currently, among various batteries, lithium batteries are attracting attention because of their high energy densities.

With regard to the lithium batteries that are currently available in the market, since liquid electrolytes including flammable organic solvents are used, installation of safety devices that suppress temperature increase at the time of short circuits is needed. Meanwhile, since all solid lithium batteries that have been produced into all solid state batteries by converting the liquid electrolyte to a solid electrolyte layer do not use flammable organic solvents in the batteries, it is contemplated that simplification of safety devices can be promoted, and the all solid lithium batteries are excellent in view of the production cost and productivity.

In the field of an all solid lithium battery, there has been an attempt to enhance battery performance by focusing on an interface between an active material and a solid electrolyte material. For example, Patent Literate 1 discloses an all solid lithium battery containing a lithium ion conductive solid electrolyte mainly composed of a sulfide and a cathode active material the surface of which is coated with lithium ion conductive oxide. Furthermore, as an example of the lithium ion conductive oxide, $LiNbO_3$ has been described.

CITATION LIST

Patent Literature

Patent Literature 1: WO 2007/004590 A

SUMMARY

Technical Problem

As described above, the all solid lithium battery does not contain a combustible organic solvent, and thus it has higher safety than a liquid-based battery in which a liquid electrolyte is used. Furthermore, because a solid electrolyte material having no fluidity is used, the all solid lithium battery has high internal resistance, and in general, it has poorer performance than a liquid-based battery. Under the circumstances, sufficient investigations regarding the safety of an all solid lithium battery have not been made in the related art.

Meanwhile, development of an all solid lithium battery with high performance is under progress. If the internal resistance of an all solid lithium battery is lowered, sufficient safety measures may be needed even for an all solid lithium battery with high safety. For example, when a nail penetration test, which is referred to as the most severe abuse test, is performed for an all solid lithium battery with low internal resistance, internal temperature of the battery increases rapidly due to the Joule heating which occurs during short circuit. As a result, the battery material may cause an undesired reaction.

The disclosed embodiments have been achieved under the circumstances described above and a main object thereof is to provide active material composite particles capable of suppressing a reaction with a sulfide solid electrolyte material at high temperature.

Solution to Problem

In order to solve the problems described above, disclosed embodiments provide an active material composite particle comprising an oxide active material of rock salt bed type and a coat layer comprising lithium niobate, the coat layer being formed on a surface of the oxide active material, characterized in that a thickness of the coat layer is in the range of 25 nm to 94 nm.

According to embodiments, as the thickness of the coat layer is equal to or greater than a pre-determined value, the reaction between a sulfide solid electrolyte material and the active material composite particle at high temperature can be suppressed.

According to embodiments, the coat layer may further comprise nitrogen.

According to embodiments, a ratio $(C_N/C_{Nb})$ of an element concentration of the nitrogen $(C_N)$ relative to an element concentration of a niobium $(C_{Nb})$ be in the range of 0.33 to 0.53 on a surface of the coat layer.

According to embodiments, the oxide active material comprises lithium and a transition metal element comprising at least one of Co, Mn, Ni, V, Cr, and Fe.

According to embodiments, an average particle diameter $(D_{50})$ of the oxide active material is in the range of 0.1 μm to 20 μm.

According to embodiments, a concentration of the lithium niobate in the coat layer is in the range of 90% or more by mass.

Further, disclosed embodiments provide an electrode active material layer comprising the aforementioned active material composite particle and a sulfide solid electrolyte material.

According to embodiments, the electrode active material layer may comprise a plurality of active material composite particles. The concentration of the active material composite particles in the electrode active material layer is in the range of 40% to 99% by volume.

According to embodiments, the sulfide solid electrolyte material comprises at least one of LiI, LiBr, and LiCl.

According to embodiments, an average particle diameter $(D_{50})$ of the sulfide solid electrolyte material is in the range of 0.1 μm to 50 μm.

According to embodiments, a concentration of the sulfide solid electrolyte material in the electrode active material layer is in the range of 1% to 60% by volume.

According to embodiments, a thickness of the electrode active material layer is in the range of 0.1 μm to 1000 μm.

According to embodiments, an electrode active material layer with high safety can be provided by using the active material composite particle that is described above.

Disclosed embodiments provide an all solid lithium battery comprising a cathode active material layer, an anode active material layer, and a solid electrolyte layer including a sulfide solid electrolyte material, the solid electrolyte layer being formed between the cathode active material layer and the anode active material layer. The cathode active material layer or the anode active material layer contains the aforementioned active material composite particle and the active material composite particle is in contact with the sulfide solid electrolyte material.

According to embodiments, an all solid lithium battery with high safety can be provided by using the active material composite particle that is described above.

According to embodiments, the cathode active material layer contains the active material composite particle described above.

According to embodiments, a thickness of the solid electrolyte layer is preferably in the range of 0.1 μm to 1000 μm.

According to embodiments, the all solid lithium battery further comprises a heat-absorbing material within the battery.

According to embodiments, the heat-absorbing material is magnesium hydroxide.

Further, disclosed embodiments provide a method of producing an active material composite particle, the method comprising preparing an oxide active material of rock salt bed type, forming a precursor layer on a surface of the oxide active material by applying a solution of lithium niobate on the surface of the oxide active material, and performing heat treatment of the precursor layer to form a coat layer comprising lithium niobate. A thickness of the coat layer is in the range of 25 nm to 94 nm.

According to embodiments, the heat treatment is performed at a temperature in the range of 100° C. to 500° C.

According to embodiments, the heat treatment is performed for a time period in the range of 30 minutes to 48 hours.

Advantageous Effects

The active material composite particle according to embodiments exhibits an effect of suppressing the reaction with a sulfide solid electrolyte material at high temperature.

DETAILED DESCRIPTION

The active material composite particle, electrode active material layer, and all solid lithium battery according to embodiments are described in detail below.

A. Active Material Composite Particles

Figure 1:
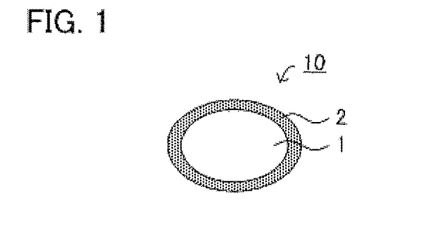
FIG. 1 is a schematic cross-sectional view illustrating an example of an active material composite particle according to an embodiment.

FIG. 1 is a schematic cross-sectional view illustrating an example of the active material composite particles according to an embodiment. An active material composite particle 10 shown in FIG. 1 comprises an oxide active material 1 of rock salt bed type and a coat layer 2 containing lithium niobate formed on a surface of the oxide active material 1. According to embodiments, the thickness of the coat layer 2 is in a pre-determined range.

According to embodiments, as the thickness of the coat layer is equal to or greater than a pre-determined value, the reaction between a sulfide solid electrolyte material and the active material composite particles at high temperature can be suppressed. Specifically, as the thickness of the coat layer has a pre-determined value or higher, the exothermic peak resulting from the reaction between a sulfide solid electrolyte material and the active material composite particles can be shifted to a high temperature side. Once the exothermic peak is shifted to a high temperature side, the reaction onset temperature for the reaction between a sulfide solid electrolyte material and the active material composite particles is basically also shifted to a high temperature side. Accordingly, it is possible to obtain an improvement in heat resistance. Meanwhile, according to embodiments, the battery function can be ensured when the thickness of the coat layer is set at a pre-determined thickness or lower.

As described above, there can be a case in which internal temperature of a battery increases rapidly due to the Joule heating which occurs during short circuit. Once the internal temperature of a battery increases, oxygen release starts from the oxide active material, and the oxygen reacts with a sulfide solid electrolyte material (oxidation reaction). As caused by the oxygen released from the oxide active material, oxidation of the sulfide solid electrolyte material consecutively occurs, consequently yielding heat generation. According to embodiments, the thickness of a coat layer is set in a pre-determined range to suppress the oxygen release from an oxide active material.

Without intending to be bound by theory, the reason for having suppressed oxygen release from an oxide active material is believed to be as follows: as the thickness of a coat layer increases, the mechanical strength is increased so that the surface of an oxide active material can be strongly bound. Specifically, when oxygen is released from an oxide active material at high temperature, a structural change of the oxide active material also occurs. Accordingly, the surface of the oxide active material is strongly bound so that it is difficult to have a structural change. Thus, it is believed that the oxygen release is suppressed accordingly. There is also a possibility that movement of oxygen gas for permeating the coat layer is inhibited as the thickness of the coat layer increases, and thus it is difficult to have a reaction with a sulfide solid electrolyte material, and the exothermic peak is shifted to a high temperature side.

Incidentally, in Examples 4 and 6 of Patent Literature 1, it is described that $LiNbO_3$ coating layer is formed on a surface of an active material, and the maximum thickness of the $LiNbO_3$ coating layer is 20 nm. Furthermore, in Patent Literature 1, an opinion on the reaction between a sulfide solid electrolyte material and active material composite particles at high temperature is neither disclosed nor suggested. Because it generally becomes more difficult for Li ions to get conducted as the coat layer thickness increases, it has been necessary in the related art that the coat layer is prepared as thin as possible to suppress a reduction of the battery performance. Meanwhile, according to embodiments, to solve a new problem that the oxygen released from an oxide active material at high temperature greatly lowers the safety of a battery, the coat layer thickness was intentionally set at a pre-determined thickness or higher.

Furthermore, as described in the following Examples, the exothermic peak can be shifted to in the range of 380° C. or higher according to embodiments. In accordance with the shift to in the range of 380° C. or higher, there is an advantage that the heat-absorbing material can be effectively utilized compared to a case in which the exothermic peak is 350° C. or lower, for example. Specifically, by disposing a heat-absorbing material within a battery, the temperature increase caused by heat generation can be suppressed. Although the chain reaction may be suppressed by shifting the exothermic peak temperature to a high temperature side, according to combined use of a heat-absorbing material, the chain reaction can be more effectively suppressed. As a representative inorganic heat-absorbing material, there is magnesium hydroxide. Decomposition temperature, that is, endothermic onset temperature, is about 350° C. for magnesium hydroxide. There are many other hydroxide-based heat-absorbing materials which have endothermic onset in the same temperature region. For such reasons, by shifting the exothermic peak temperature to in the range of 380° C. or higher, the heat-absorbing material can be effectively utilized.

The constitution of the active material composite particles according to embodiments is described below.

1. Oxide Active Material

The oxide active material according to embodiments has a rock salt bed type structure. Furthermore, the oxide active material contains at least oxygen. However, it is preferable that a transition metal be further contained. Examples of the transition metal element include at least one of Co, Mn, Ni, V, Cr, and Fe. Among them, it is preferable that the oxide active material contain at least one of Co, Mn, and Ni. Furthermore, the oxide active material may contain all of Co, Mn, and Ni. Furthermore, the oxide active material typically contains lithium. Examples of the oxide active material of rock salt bed type include $LiCoO_2$, $LiNiO_2$, $LiCo_{1/3}Ni_{1/3}Mn_{1/3}O_2$, $LiVO_2$, and $LiCrO_2$.

The shape of the oxide active material is not particularly limited, and examples thereof include a spherical shape. The average particle diameter ($D_{50}$) of the oxide active material is in the range of 0.1 µm or more, for example. It is preferably in the range of 1 µm or more. Meanwhile, the average particle diameter ($D_{50}$) of the oxide active material is in the range of 20 µm or less, for example, and it is preferably in the range of 10 µm or less. The average particle diameter ($D_{50}$) of the oxide active material can be obtained by a method of analyzing a SEM image or a measurement method which uses a particle size distribution analyzer. Furthermore, the oxide active material can be used as either a cathode active material or an anode active material.

2. Coat Layer

The coat layer according to embodiments indicates a coat layer which is formed on a surface of the oxide active material and contains lithium niobate. The ratio of lithium niobate in the coat layer is in the range of 90% by mass or more, for example. The ratio of impurities like hydration water or the like is preferably in the range of 10% by mass or less. In addition, the lithium niobate can be amorphous or crystalline.

The thickness of the coat layer is generally in the range of 25 nm or more. It can be in the range of 30 nm or more or in the range of 35 nm or more. Meanwhile, the thickness of the coat layer is generally in the range of 94 nm or less. It can be in the range of 90 nm or less or in the range of 75 nm or less. The thickness of the coat layer can be measured by observation using a transmission type electron microscope (TEM), for example. It is preferable to have a large number of samples, and thickness is measured for, for example, 10 or more, and preferably 100 or more samples and calculated as an average value.

The coating rate of the coat layer is preferably as high as possible. For example, it is in the range of 50% or more, and preferably in the range of 80% or more. Incidentally, the coating rate of the coat layer can be 100%. The coating rate of the coat layer can be measured by using a transmission type electron microscope (TEM) or X ray photoelectron spectrophotometry (XPS), for example.

The coat layer preferably contains nitrogen, because it can reduce the reaction resistance of a coat layer. It is assumed that, the crystal structure of lithium niobate is deformed as nitrogen is introduced to the coat layer, and thus the Li ion conductivity of the coat layer is improved. When the ratio ($C_N/C_{Nb}$) of an element concentration of the nitrogen ($C_N$) relative to an element concentration of the niobium ($C_{Nb}$) is measured for the surface of a coat layer, the $C_N/C_{Nb}$ is preferably in the range of 0.33 to 0.53. Incidentally, the $C_N/C_{Nb}$ can be obtained by measurement using a photoelectron spectrophotometric analyzer. Details of the measurement method are described below.

As a method for forming the coat layer containing nitrogen, a method of using a precursor solution containing nitrogen can be mentioned. For example, as described in the following Examples, when ammonia water is used for preparing a precursor solution containing peroxo complex of niobium, there is a possibility that the ammonia serves as a nitrogen source. Furthermore, it is also possible that niobic acid (niobium hydroxide) contains a nitrogen fraction. For example, when a nitrogen-containing reagent is used for extracting and precipitating niobium with solvent by dissolving raw material mineral in acid or the like, niobic acid (niobium hydroxide) may contain a nitrogen fraction. Incidentally, since nitrogen in the air is inert, a coat layer containing nitrogen is not obtained even when a heat treatment is carried out in air atmosphere.

3. Active Material Composite Particles

The active material composite particles according to embodiments have an oxide active material and a coat layer. The average particle diameter ($D_{50}$) of the oxide active material is in the range of 0.2 µm or more, for example, and it is preferably in the range of 1 µm or more. Meanwhile, the average particle diameter ($D_{50}$) of the oxide active material is in the range of 20 µm or less, for example, and it is preferably in the range of 10 µm or less. Furthermore, the active material composite particles according to embodiments are generally used for an all solid lithium battery.

4. Method for Producing Active Material Composite Particles

Figure 2A:
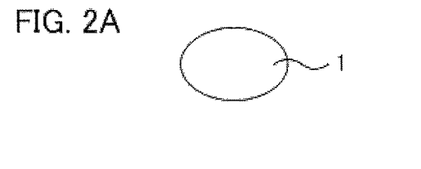
FIGS. 2A, 2B and 2C are schematic cross-sectional views illustrating an example of a method for producing an active material composite particle according to an embodiment.
Figure 2B:
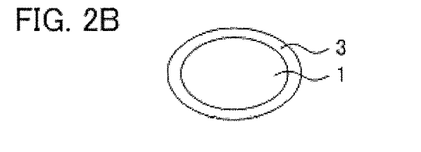
Figure 2C:
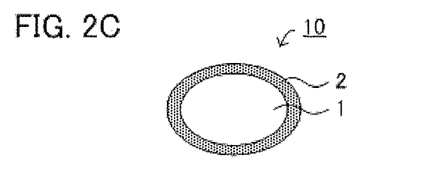

The method for producing the active material composite particles according to embodiments is not particularly limited. FIGS. 2A, 2B and 2C are schematic cross-sectional views illustrating an example of the method for producing active material composite particles according to embodiments. In FIGS. 2A, 2B and 2C, the oxide active material 1 is prepared first (FIG. 2A). Next, on a surface of the oxide active material 1, a precursor solution of lithium niobate was applied to form the precursor layer 3 (FIG. 2B). Next, by performing a heat treatment of the precursor layer 3, the coat layer 2 containing lithium niobate is formed (FIG. 2C). Accordingly, the active material composite particle 10 is obtained.

(1) Precursor Solution

The precursor solution according to embodiments generally contains a raw material for lithium niobate and a solvent.

The precursor solution generally contains Li source and Nb source of lithium niobate. Examples of the Li source include Li alkoxide, Li inorganic salt, and Li hydroxide. Examples of the Li alkoxide include ethoxy lithium and methoxy lithium. Examples of the Li inorganic salt include lithium nitric acid, lithium sulfuric acid, and lithium acetic acid. Examples of the Li hydroxide include lithium hydroxide.

Examples of the Nb source include Nb alkoxide, Nb inorganic salt, Nb hydroxide, and Nb complex. Examples of the Nb alkoxide include, pentaethoxy niobium, pentamethoxy niobium, penta-i-propoxy niobium, penta-n-propoxy niobium, penta-i-butoxy niobium, penta-n-butoxy niobium, and penta-sec-butoxy niobium. Examples of the Nb inorganic salt include niobium acetic acid. Examples of the Nb hydroxide include niobium hydroxide. Examples of the Nb complex include peroxo complex of Nb (peroxoniobic acid complex, $[Nb(O_2)_4]^{3-}$).

The precursor solution containing a peroxo complex of Nb has an advantage that it has less gas generation amount compared to a precursor solution containing Nb alkoxide. As a method for producing the precursor solution containing a peroxo complex of Nb, a method of adding hydrogen peroxide and ammonia water to Nb oxide or Nb hydroxide can be mentioned. The addition amount of hydrogen peroxide and ammonia water can be suitably adjusted such that a transparent solution (homogenous solution) is obtained.

The type of the solvent for the precursor solution is not particularly limited, and examples thereof include alcohol and water. Examples of the alcohol include methanol, ethanol, propanol, and butanol. When the precursor solution contains alkoxide, for example, the solvent is preferably anhydrous or dehydrated alcohol. Meanwhile, when the precursor solution contains a peroxo complex of Nb, for example, the solvent is preferably water.

(2) Application Method

The method for applying a precursor solution on a surface of an oxide active material is not particularly limited, and examples thereof include a fluid bed coating method and a spray dryer method. According to a fluid bed coating method, a homogeneous precursor layer is formed. The air flow temperature (gas temperature) is in the range of 40° C. to 100° C., for example. Examples of a device for fluid bed coating include a multiplex manufactured by Powlex Co., Ltd. and a flow coater manufactured by FREUND Corporation. As another application method, a method of immersing an oxide active material in a precursor solution followed by solvent drying can be mentioned.

(3) Heat Treatment

The temperature for the heat treatment is not particularly limited, if it is temperature enabling forming of a coat layer. However, in embodiments it is in the range of 100° C. or higher, for example. It is preferably in the range of 150° C. or higher, and more preferably in the range of 200° C. or higher. Meanwhile, the heat treatment temperature is in the range of 500° C. or lower, for example. It is preferably in the range of 400° C. or lower.

Time for the heat treatment is suitably set to form a desired coat layer. The time for the heat treatment is in the range of 30 minutes to 48 hours, for example. Preferably, it is in the range of 1 hour to 20 hours. Furthermore, the atmosphere of the heat treatment is preferably an atmosphere containing oxygen, for example, because the lithium niobate can be easily formed in the presence of oxygen. Examples of the atmosphere containing oxygen include air atmosphere. Furthermore, examples of the heat treatment method include a method using a calcination furnace.

B. Electrode Active Material Layer

The electrode active material layer according to embodiments contains the aforementioned active material composite particles and a sulfide solid electrolyte material.

According to embodiments, an electrode active material layer with high safety can be provided by using the aforementioned active material composite particles.

The electrode active material layer contains at least the active material composite particles and a sulfide solid electrolyte material. The active material composite particles are as defined in the above "A. Active material composite particles". The ratio of the active material composite particles in the electrode active material layer is in the range of 40% by volume or more, for example. It is preferably in the range of 50% by volume or more. When the ratio of the active material composite particles is excessively low, there is a possibility to have a battery with low capacity. Meanwhile, the ratio of the active material composite particles in the electrode active material layer is in the range of 99% by volume or less, for example. It is preferably in the range of 90% by volume or less. When the ratio of the active material composite particles is excessively high, there is a possibility that the Li ion conductivity of the electrode active material layer is lowered.

Examples of the sulfide solid electrolyte materials include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which, "m" and "n" represent a positive number, an d Z represents any one of Ge, Zn, and Ga), $Li_2S$—$GeS_2$, $Li_2S$—$SiS_2$—$Li_3PO_4$, $Li_2S$—$SiS_2$—$Li_xMO_y$ (in which, "x" and "y" represent a positive number, and M represents any one of P, Si, Ge, B, Al, Ga, and In), and $Li_{10}GeP_2S_{12}$.

In particular, the sulfide solid electrolyte material preferably has an ion conductor which contains Li, A (A is at least one of P, Si, Ge, Al and B), and S. Furthermore, the ion conductor preferably has, as a main component of the anion, an anion structure of ortho composition ($PS_4^{3-}$ structure, $SiS_4^{4-}$ structure, $GeS_4^{4-}$ structure, $AlS_3^{3-}$ structure, $BS_3^{3-}$ structure), because a sulfide solid electrolyte material with high chemical stability can be provided. The ratio of the anion structure of ortho composition is, relative to the whole anion structures in an ion conductor, preferably in the range of 70% by mol or more, and more preferably in the range of 90% by mol or more. The ratio of the anion structure of ortho composition can be determined by Raman spectroscopy, NMR, XPS, or the like.

The sulfide solid electrolyte material preferably contains, in addition to the above ion conductor, at least one of LiI, LiBr, and LiCl. At least part of LiI, LiBr, and LiCl is generally present, each as a LiI component, a LiBr component, and a LiCl component, in a state in which it is intercalated in the structure of an ion conductor. Furthermore, the sulfide solid electrolyte material may or may not have a LiI peak according to X ray diffraction measurement. The latter is preferable because Li ion conductivity is high. The same holds true for LiBr and LiCl. The ratio of LiX (X=I, Cl, or Br) in the sulfide solid electrolyte material is in the range of 10% by mol to 30% by mol, for example. It is preferably in the range of 15% by mol to 25% by mol. The ratio of LiX indicates the ratio of whole LiX contained in the sulfide solid electrolyte material.

The sulfide solid electrolyte material can be either a crystalline material or an amorphous material. Furthermore, the sulfide solid electrolyte material can be either glass or crystallized glass (glass ceramics). Examples of the method for producing glass include a method of performing an amorphization treatment of a raw material composition. Examples of the amorphization treatment include a melting and rapid cooling method and a mechanical milling method. As a method for producing crystallized glass, a method of heating glass to temperature which is equal to or higher than crystallization temperature can be mentioned, for example. Furthermore, as a method for producing a crystalline material, a method of heating a raw material composition in solid form itself (solid phase method) can be mentioned.

The shape of the sulfide solid electrolyte material is not particularly limited, and examples thereof include a spherical shape. The average particle diameter ($D_{50}$) of the sulfide solid electrolyte material is in the range of 0.1 μm or more, for example. It may be in the range of 0.5 μm or more. Meanwhile, the average particle diameter ($D_{50}$) of the sulfide solid electrolyte material is in the range of 50 μm or less, for example, and it may be in the range of 10 μm or less. Furthermore, the Li ion conductivity (25° C.) of the sulfide solid electrolyte material is in the range of $1 \times 10^{-5}$ S/cm or more, for example. It is preferably in the range of $1 \times 10^{-4}$ S/cm or more, or more preferably in the range of $1 \times 10^{-3}$ S/cm or more.

In the electrode active material layer, the ratio of the sulfide solid electrolyte material is in the range of 1% by volume or more, for example, and it is preferably, in the range of 10% by volume or more. If the ratio of the sulfide solid electrolyte material is excessively low, there is a possibility that the Li ion conductivity of the electrode active material layer is not sufficiently improved. Meanwhile, the ratio of the sulfide solid electrolyte material in the electrode active material layer is in the range of 60% by volume or less, for example, and it is preferably in the range of 50% by volume or less. If the ratio of the sulfide solid electrolyte material is excessively high, the electrode active material ratio becomes relatively low, and thus there is a possibility the capacity of a battery is lowered. Furthermore, in the electrode active material layer, the ratio of the sulfide solid electrolyte material is preferably lower than the ratio of the electrode active material layer.

The electrode active material layer may additionally contain a conductive material. By adding a conductive material, the electron conduction of the electrode active material layer can be improved. Examples of the conductive material include a carbon material such as acetylene black (AB), ketjen black (KB), vapor phase grown carbon fiber (VGCF), carbon nanotube (CNT), or carbon nanofiber (CNF).

The electrode active material layer may additionally contain a binder. By adding a binder, the molding property of the electrode active material layer can be improved. Examples of the binder include an acrylic binder, a fluorine-containing binder like PVDF and PTFE, and a rubber binder like butadiene rubber. Furthermore, the rubber binder may be a hydrogenated binder or a hydrogenated binder of which terminals are additionally added with a functional group.

The thickness of the electrode active material layer is in the range of 0.1 μm to 1000 μm, for example. It is preferably in the range of 0.1 μm to 300 μm.

C. All Solid Lithium Battery

Figure 3:
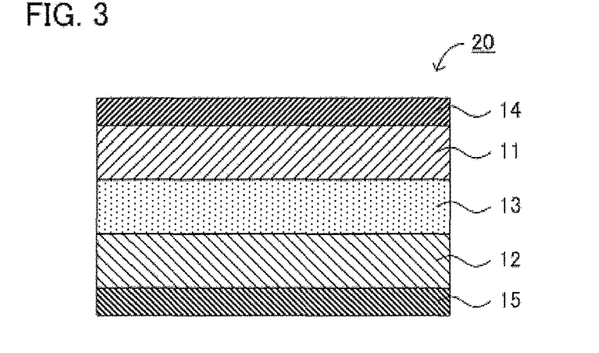
FIG. 3 is a schematic cross-sectional view illustrating an example of an all solid lithium battery according to an embodiment.

FIG. 3 is a schematic cross-sectional view illustrating an example of the all solid lithium battery according to embodiments. In FIG. 3, the all solid lithium battery 20 comprises the cathode active material layer 11, the anode active material layer 12, the solid electrolyte layer 13 formed between the cathode active material layer 11 and the anode active material layer 12, the cathode current collector 14 for performing current collection by the cathode active material layer 11, and the anode current collector 15 for performing current collection by the anode active material layer 12. According to embodiments, the cathode active material layer 11 or the anode active material layer 12 contains the active material composite particles that are described above. Furthermore, the active material composite particles are in contact with the sulfide solid electrolyte material. For example, when the cathode active material layer 11 contains the active material composite particles, the active material composite particles are in contact with the sulfide solid electrolyte material which is contained in at least one of the cathode active material layer 11 and solid electrolyte layer 13. The same holds true for a case in which the anode active material layer 12 contains the active material composite particles.

According to embodiments, an all solid lithium battery with high safety can be provided by using the active material composite particles that are described above.

The constitution of the all solid lithium battery according to embodiments is described below.

1. Cathode Active Material Layer

The cathode active material layer according to embodiments is a layer which contains at least a cathode active material, and it may further contain at least one of a solid electrolyte material, a conductive material, and a binder, if necessary. Furthermore, the cathode active material layer is preferably the electrode active material layer that is described above.

2. Anode Active Material Layer

The anode active material layer according to embodiments is a layer which contains at least an anode active material, and it may further contain at least one of a solid electrolyte material, a conductive material, and a binder, if necessary. Furthermore, the anode active material layer is preferably the electrode active material layer which is described above. Meanwhile, when the cathode active material layer is the electrode active material layer that is described above, any material can be used for an anode active material. Examples of the anode active material include a carbon active material, a metal active material, and an oxide active material. Examples of the carbon active material include graphite, hard carbon, and soft carbon. Examples of the metal active material include In, Al, Si, Sn, and an alloy at least containing them.

3. Solid Electrolyte Layer

The solid electrolyte layer according to embodiments is a layer which is formed between the cathode active material layer and anode active material layer. The solid electrolyte material is a layer which contains at least a solid electrolyte material, and it may additionally contain a binder, if necessary. The solid electrolyte material is preferably a sulfide solid electrolyte material. The sulfide solid electrolyte material and binder are as defined in the above "B. Electrode active material layer".

The ratio of the solid electrolyte material contained in the solid electrolyte layer is in the range of 10% by volume to 100% by volume, for example, and it is preferably, in the range of 50% by volume to 100% by volume. The thickness of the solid electrolyte layer is preferably in the range of 0.1 μm to 1000 μm, and preferably in the range of 0.1 μm to 300 μm. Furthermore, the method for forming the solid electrolyte layer includes a method of compressing and molding a solid electrolyte material.

4. Other Constitutions

The all solid lithium battery according to embodiments comprises at least the cathode active material layer, anode active material layer, and solid electrolyte layer that are described above. In addition, it generally comprises a cathode current collector for performing current collection by a cathode active material layer and an anode current collector for performing current collection by an anode active material layer. Examples of the material of the cathode current collector include SUS, Ni, Cr, Au, Pt, Al, Fe, Ti, and Zn. Meanwhile, examples of the material of the anode current collector include SUS, Cu, Ni, Fe, Ti, Co, and Zn. Furthermore, in the disclosed embodiments, any suitable battery case, such as a battery case made of SUS, can be used.

5. All Solid State Battery

The all solid lithium battery according to embodiments may be a primary battery or a secondary battery, and the secondary battery is preferable. The reason for the preference is that repetitive charging and discharging are possible, and the secondary battery is useful, for example, as an in-vehicle battery. Examples of the shape of the all solid state battery of disclosed embodiments include a coin type, a laminate type, a cylinder type, and a square type.

Incidentally, the disclosure is not intended to be limited to the embodiment described above. The embodiment described above is given only for illustrative purposes, and any embodiment having substantially the same configuration as the subject matter recited in the claims and providing similar operating effects, is construed to be included in the technical scope of disclosed embodiments.

EXAMPLES

Hereinafter, disclosed embodiments will be described more specifically by way of the Examples.

Example 1

(Preparation of Precursor Solution)

To a container added with 870.4 g of hydrogen peroxide with a concentration of 30% by mass, 987.4 g of ion exchange water and 44.2 g of niobic acid (niobium hydroxide, $Nb_2O_5 \cdot 3H_2O$ ($Nb_2O_5$ content ratio: 72%)) were added. Next, 87.9 g of ammonia water with a concentration of 28% by mass were added to the container. Then, by sufficient stirring after the addition of ammonia water, a transparent solution was obtained. Additionally, by adding 10.1 g of lithium hydroxide.monohydrate ($LiOH \cdot H_2O$) to the obtained transparent solution, a precursor solution containing peroxo complex of niobium and lithium was obtained. The molar concentration of Li and Nb in the obtained precursor solution was 0.12 mol/kg for each.

(Coating Application and Heat Treatment)

The obtained precursor solution was spray-dried on 1 kg of the cathode active material $LiNi_{1/3}Mn_{1/3}Co_{1/3}O_2$ by using a tumbling fluidized bed type coating machine (MP-01™, manufactured by Powrex Corp.). The operation conditions include the followings; intake gas:nitrogen, intake gas temperature: 170° C., intake gas amount: 0.4 m³/min, rotor revolution number: 400 rpm, and spray speed: 14.4 g/min. Accordingly, a precursor layer was formed on a surface of the active material. After that, according to a heat treatment in air at 200° C. for 5 hours, a coat layer (thickness: 25 nm) consisting of lithium niobate ($LiNbO_3$) was formed. Accordingly, active material composite particles were obtained.

Comparative Example 1

The coat layer was not formed and $LiNi_{1/3}Mn_{1/3}Co_{1/3}O_2$ was used as a sample for measurement.

Example 2 and Comparative Examples 2 and 3

The active material composite particles were obtained in the same manner as Example 1 except that the use amount of the precursor solution was adjusted and the thickness of the coat layer was modified to 75 nm, 7 nm, and 15 nm, respectively.

Evaluation (DSC Measurement)

DSC measurement was carried out for the active material composite particles which have been obtained from Examples 1 and 2 and Comparative Examples 1 to 3. Specifically, 52 g of the active material composite particles, 17 g of the sulfide solid electrolyte material ($Li_3PS_4$), and 1 g of VGCF (manufactured by Showa Denko K.K.) as a conductive material were added, together with a binder, to heptane followed by dispersion using an ultrasonic homogenizer to prepare cathode slurry. Next, the cathode slurry was applied on a stainless plate, and after drying, it was scraped off. The obtained dried powder (10 mg) was added to a pan for DSC measurement, and then subjected to measurement using a differential scanning calorimeter DSC7000X™ (manufactured by Hitachi High-Tech Science Corporation) at conditions of 10° C./min from room temperature (25° C.) to 500° C. Incidentally, for each sample, the peak at the lowest temperature side was determined as an exothermic peak. The results are shown in Table 1 and FIG. 4.

(Measurement of Nitrogen Ratio)

Nitrogen ratio on a surface of the coat layer of the active material composite particles which have been obtained from Examples 1 and 2 and Comparative Examples 1 to 3 was measured. By using a photoelectron spectrophotometric analyzer (PHI Quantera SXM, manufactured by Physical Electronics), the surface of the active material composite particles was analyzed to specify the element concentration of each element present on a surface of the coat layer. Specifically, after performing peak shift calibration at C1s (248.7 eV), the element concentration was calculated from the photoelectron spectrum peak of Nb3d and N1s. Calculation of the element concentration was made based on the following formula (1) in view of the peak intensity (peak area) and relative sensitivity coefficient of each element.

[Mathematical Formula 1]

$$C_i = \frac{\left(\frac{I_i}{S_i}\right)}{\sum_{j=1}^{N}\left(\frac{I_j}{S_j}\right)} \times 100 \quad (1)$$

(in the formula (1), C represents element concentration (atm %), I represent photoelectron intensity (peak area), S represents relative sensitivity coefficient, and subscripts i and j represent type of the element).

Namely, the ratio ($C_N/C_{Nb}$) of an element concentration of the nitrogen $C_N$ (atm %) relative to an element concentration of the niobium $C_{Nb}$ (atm %) on a surface of the coat layer was calculated based on the following formula (2). Herein, the relative sensitivity coefficient S was as follows: 3.127 for niobium and 0.499 for nitrogen. The results are shown in Table 1.

[Mathematical Formula 2]

$$\frac{C_N}{C_{Nb}} = \frac{\left(\frac{I_N}{S_N}\right)}{\left(\frac{I_{Nb}}{S_{Nb}}\right)} \quad (2)$$

TABLE 1

|  | Coat Layer Thickness [nm] | Exothermic Peak Temperature [° C.] | Nitrogen Ratio ($C_N/C_{Nb}$) |
|---|---|---|---|
| COMPARATIVE EXAMPLE 1 | 0 | 304 | 0 |
| COMPARATIVE EXAMPLE 2 | 7 | 332 | 0.11 |
| COMPARATIVE EXAMPLE 3 | 15 | 345.3 | 0.15 |
| EXAMPLE 1 | 25 | 386.2 | 0.33 |
| EXAMPLE 2 | 75 | 383.9 | 0.53 |

Figure 4:
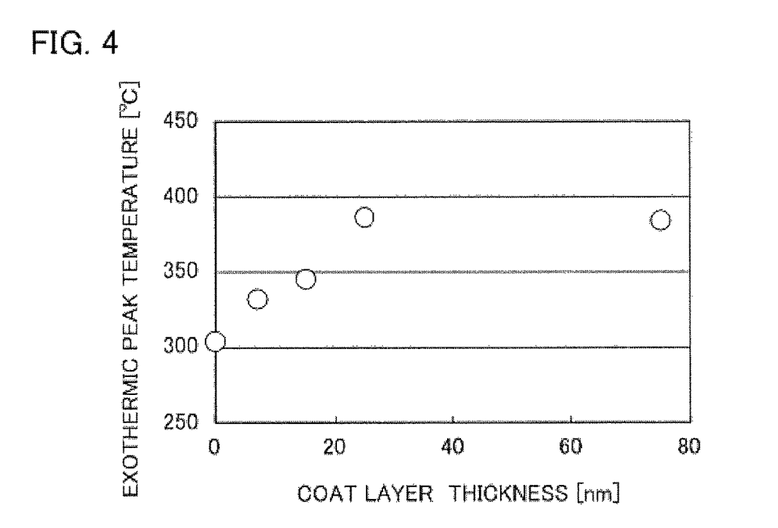
FIG. 4 shows the result of DSC measurement for the active material composite particles obtained from Examples 1 and 2 and Comparative Examples 1 to 3.

As shown in Table 1 and FIG. 4, when the coat layer has thickness of 25 nm or more, the exothermic peak was 380° C. or higher. Furthermore, in Examples 1 and 2 and Comparative Examples 2 and 3, the coat layer contains nitrogen, but no nitrogen was contained in the coat layer of Comparative Example 1.

Reference Example

Ethoxy lithium was dissolved by adding it to a container added with dehydrated ethanol, and it was homogenously dispersed in the dehydrated ethanol. After that, to the container added with ethoxy lithium and dehydrated ethanol, pentaethoxy niobium was added such that the element ratio (molar) between lithium and niobium is 1:1. Then, by stirring until the pentaethoxy niobium is homogeneously mixed, a precursor solution (alkoxide solution) was prepared. Incidentally, the addition amount of the ethoxy lithium was adjusted such that the solid content ratio in the alkoxide solution is 6.9% by mass.

The obtained precursor solution was spray-dried on 1 kg of the cathode active material $LiNi_{1/3}Mn_{1/3}Co_{1/3}O_2$ by using a tumbling fluidized bed type coating machine (MP-01™, manufactured by Powrex Corp.). The operation conditions included the following: intake gas:nitrogen, intake gas temperature: 80° C., intake gas amount: 0.3 m³/min, rotor revolution number: 400 rpm, and spray speed: 1.5 g/min. Accordingly, a precursor layer was formed on a surface of the active material. After that, according to a heat treatment in air at 350° C. for 5 hours, a coat layer (thickness: 70 nm) consisting of lithium niobate ($LiNbO_3$) was formed. Accordingly, active material composite particles were obtained. The nitrogen ratio on a surface of the coat layer of the obtained active material composite particles was measured in the same manner as above. As a result, the nitrogen ratio was found to be 0.

Comparative Example 4 and Examples 3 to 5

The active material composite particles were obtained in the same manner as Example 1 except that the use amount of the precursor solution was adjusted and the thickness of the coat layer was modified to 10 nm, 37 nm, 50 nm, and 62 nm, respectively.

Evaluation (Production of Battery for Evaluation)

A battery for evaluation was produced by using the active material composite particles which have been obtained from Examples 1 to 5 and Comparative Examples 2 to 4. First, the active material composite particles and sulfide solid electrolyte material ($Li_3PS_4$) were added at ratio of 6:4 (volume ratio) to heptane. Furthermore, VGCF (manufactured by Showa Denko K.K.) was added as a conductive material at ratio of 3% by mass, and butylene rubber (manufactured by JSR CORPORATION) as a binder was added at ratio of 0.7% by mass to produce cathode slurry. The obtained cathode slurry was dispersed by using an ultrasonic homogenizer and then applied on an aluminum foil. After drying at 100° C. for 30 minutes, it was punched to 1 cm² to yield a cathode.

Next, an anode active material (layered carbon) and sulfide solid electrolyte material ($Li_3PS_4$) were added at ratio of 6:4 (volume ratio) to heptane. Furthermore, butylene rubber (manufactured by JSR Corporation) as a binder was added at ratio of 1.2% by mass to produce anode slurry. The obtained anode slurry was dispersed by using an ultrasonic homogenizer and then applied on a copper foil.

After drying at 100° C. for 30 minutes, it was punched to 1 cm² to yield an anode. Next, to a barrel-shape ceramics with inside diameter cross-sectional area of 1 cm², 64.8 mg of sulfide solid electrolyte material ($Li_3PS_4$) was added and smoothen followed by compression at 1 ton to form a solid electrolyte layer. On both surfaces of the layer, the cathode and anode was added followed by compression for 1 minute at 4.3 ton. Then, a stainless rod was added to both electrodes and fixed at 1 ton to give a battery. Accordingly, a battery for evaluation was obtained.

For the obtained battery for evaluation, a discharge capacity measurement was carried out. Specifically, CC charging was performed at C rate ⅓ with charging voltage of 4.55 V and then CV charging was performed by having C rate 1/100 as a lower limit. After that, CCCV discharging was performed at the same C rate ⅓ (lower limit: 1/100) with discharging voltage of 2.5 V. The results are shown in Table 2 and FIG. 5.

TABLE 2

|  | Coat Layer Thickness [nm] | CCCV Discharge Capacity [mAh/g] |
|---|---|---|
| COMPARATIVE EXAMPLE 2 | 7 | 203 |
| COMPARATIVE EXAMPLE 4 | 10 | 201 |
| COMPARATIVE EXAMPLE 3 | 15 | 191 |
| EXAMPLE 1 | 25 | 178 |

TABLE 2-continued

| | Coat Layer Thickness [nm] | CCCV Discharge Capacity [mAh/g] |
|---|---|---|
| EXAMPLE 3 | 37 | 147 |
| EXAMPLE 4 | 50 | 100 |
| EXAMPLE 5 | 62 | 79 |
| EXAMPLE 2 | 75 | 43 |

Figure 5:
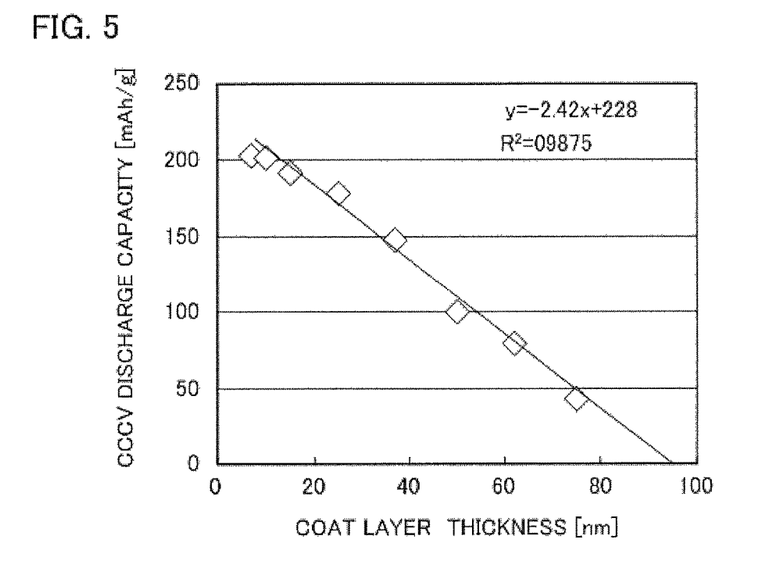
FIG. 5 shows the result of discharge capacity measurement for an evaluation battery in which the active material composite particles obtained from Examples 1 to 5 and Comparative Examples 2 to 4 are used.

As it has been shown in Table 2 and FIG. 5, any one of Examples 1 to 5 and Comparative Examples 2 to 4 can function as a battery. Furthermore, from the approximate expression shown in FIG. 5, it was demonstrated that they are useful as a battery if the coat layer thickness is as high as 94 nm.

It will be appreciated that the above-disclosed features and functions, or alternatives thereof, may be desirably combined into different compositions, systems or methods. Also, various alternatives, modifications, variations or improvements may be subsequently made by those skilled in the art, and are also intended to be encompassed by the following claims. As such, various changes may be made without departing from the spirit and scope of this disclosure.

What is claimed is:

1. An electrode active material layer comprising:
   a sulfide solid electrolyte material; and
   an active material composite particle comprising:
      an oxide active material of rock salt bed type; and
      a coat layer comprising lithium niobate and nitrogen, the coat layer being formed on a surface of the oxide active material,
   wherein:
      a thickness of the coat layer is in the range of 25 nm to 94 nm, and
      a ratio ($C_N/C_{Nb}$) of an element concentration of the nitrogen ($C_N$) relative to an element concentration of a niobium ($C_{Nb}$) is in the range of 0.33 to 0.53 on a surface of the coat layer.

2. The electrode active material layer according to claim 1, wherein the oxide active material comprises lithium and a transition metal element comprising at least one of Co, Mn, Ni, V, Cr, and Fe.

3. The electrode active material layer according to claim 1, wherein an average particle diameter (D50) of the oxide active material is in the range of 0.1 pm to 20 pm.

4. The electrode active material layer according to claim 1, wherein a concentration of the lithium niobate in the coat layer is in the range of 90% or more by mass.

5. The electrode active material layer according to claim 1, further comprising a plurality of active material composite particles,
   wherein a concentration of the active material composite particles in the electrode active material layer is in the range of 40% to 99% by volume.

6. The electrode active material layer according to claim 1, wherein the sulfide solid electrolyte material comprises at least one of LiI, LiBr, and LiCl.

7. The electrode active material layer according to claim 1, wherein an average particle diameter ($D_{50}$) of the sulfide solid electrolyte material is in the range of 0.1 μm to 50 μm.

8. The electrode active material layer according to claim 1, wherein a concentration of the sulfide solid electrolyte material in the electrode active material layer is in the range of 1% to 60% by volume.

9. The electrode active material layer according to claim 1, wherein a thickness of the electrode active material layer is in the range of 0.1 pm to 1000 pm.

10. A method of producing the electrode active material layer according to claim 7, the method comprising:
    preparing an oxide active material of rock salt bed type;
    forming a precursor layer on a surface of the oxide active material by applying a solution of lithium niobate and nitrogen on the surface of the oxide active material;
    performing heat treatment of the precursor layer to form a coat layer comprising lithium niobate and nitrogen to obtain the active material composite particle; and
    forming the electrode active material layer using the active material composite particle and a sulfide solid electrolyte material.

11. The method according to claim 10, wherein the heat treatment is performed at a temperature in the range of 100° C. to 500° C.

12. The method according to claim 10, wherein the heat treatment is performed for a time period in the range of 30 minutes to 48 hours.

13. An all solid lithium battery comprising:
    a cathode active material layer;
    an anode active material layer; and
    a solid electrolyte layer including a sulfide solid electrolyte material, the solid electrolyte layer being formed between the cathode active material layer and the anode active material layer,
    wherein the cathode active material layer or the anode active material layer contains an active material composite particle that is in contact with the sulfide solid electrolyte material, the active material composite particle comprising:
       an oxide active material of rock salt bed type; and
       a coat layer comprising lithium niobate and nitrogen, the coat layer being formed on a surface of the oxide active material,
    and wherein:
       a thickness of the coat layer is in the range of 25 nm to 94 nm, and
       a ratio ($C_N/C_{Nb}$) of an element concentration of the nitrogen ($C_N$) relative to an element concentration of a niobium ($C_{Nb}$) is in the range of 0.33 to 0.53 on a surface of the coat layer.

14. The all solid lithium battery according to claim 13, wherein the cathode active material layer comprises the active material composite particle.

15. The all solid lithium battery according to claim 13, wherein a thickness of the solid electrolyte layer is in the range of 0.1 um to 1000 um.

16. The all solid lithium battery according to claim 13, further comprising a heat-absorbing material within the battery.

17. The all solid lithium battery according to claim 16, wherein the heat-absorbing material is magnesium hydroxide.

* * * * *